US005999497A

United States Patent [19]

Ochiai et al.

[11] Patent Number: 5,999,497

[45] Date of Patent: Dec. 7, 1999

[54] KARAOKE MACHINE INCLUDING PLAYBACK RESERVATION SYSTEM

[75] Inventors: Yoshio Ochiai, Saitama; Koni Saito, Tokyo, both of Japan

[73] Assignee: Sony Corporation, Tokyo, Japan

[21] Appl. No.: 08/931,805

[22] Filed: Sep. 16, 1997

[30] Foreign Application Priority Data

Sep. 30, 1996 [JP] Japan ............................ P08-259962

[51] Int. Cl.[6] ...................................... H04B 1/20

[52] U.S. Cl. ...................................... 369/2; 369/4

[58] Field of Search ............................ 369/2, 6, 12, 30, 369/3, 4, 33, 36, 34, 32, 1; 360/12, 72.2, 48; 84/601, 609, 645, 625, 634

[56] References Cited

U.S. PATENT DOCUMENTS 5,168,481 12/1992 Culbertson et al. ........................ 369/2
5,195,065 3/1993 Kato et al. .................................. 369/2
5,566,146 10/1996 Tobe ............................................ 369/2
5,815,468 9/1998 Muramatsu et al. ........................ 369/2

*Primary Examiner*—Ali Neyzari
*Attorney, Agent, or Firm*—Limbach & Limbach, LLP

[57] ABSTRACT

A compound-playback apparatus is provided which is capable of playing back both video tapes and VCDs, capable of making playback reservations in respect of both video tapes and VCDs, capable of adding the next reservation while a reservation playback is being executed, and which is structured in such a way that a lyrics caption section is not blocked out while the reservation screen is being displayed. The compound-playback apparatus includes a tape-playback control device for controlling the playback of magnetic recording tapes, a compact-disk playback control device for controlling the playback of compact disks, and a main control device for controlling the tape-playback control device and the compact-disk playback control device, with a playback reservation device for making reservations of the playback sequence of the recorded contents in respect of video tapes and VCDs being provided in the main control device.

10 Claims, 14 Drawing Sheets

FIG. 9

| | | CONDITION C IS SATISFIED | WHEN NOT CONDITION C<br>TAPE EJECT | WHEN NOT CONDITION C<br>NOT TAPE STOP |
|---|---|---|---|---|
| CONDITION D IS SATISFIED | | EXECUTION OK | WARNING MESSAGE A | WARNING MESSAGE B |
| WHEN NOT CONDITION D | NO DISK | WARNING MESSAGE A | WARNING MESSAGE A | WARNING MESSAGE A |
| WHEN NOT CONDITION D | NOT DISK STOP | WARNING MESSAGE B | WARNING MESSAGE A | WARNING MESSAGE B |

FIG. 13A
(VHS / INDEX SEARCH KEY)
(FORWARD)
FIG. 13B
(VHS / INDEX SEARCH KEY)
(REWIND)
FIG. 13C
CHOI (KEY ATTACHED TO MIKE /
CHOI (SHORT) RETURN )

KARAOKE MACHINE INCLUDING PLAYBACK RESERVATION SYSTEM

BACKGROUND OF THE INVENTION

1. Field of the Invention

The present invention relates to a compound-playback apparatus and, more particularly, to improvements in performing karaoke reservation in a compound-playback apparatus capable of integratedly playing back a video tape and a VCD.

2. Description of the Related Art

A PROGRAM function for a video compact disk (here, a generic name for a video disk, including a digital video disk: hereinafter referred to as a VCD), a KARAOKE PROGRAM function of a video tape, and a reservation-playback function for playback apparatuses which are independent of each other are already available.

However, in a compound-playback machine for video tapes and VCDs, models capable of integrated-playback reservation of a video tape and a VCD are not available. For this reason, also in a compound machine, when karaoke spanning between two types of sources is performed, it is necessary to make a reservation for each source or to perform a playback operation for each musical selection.

Furthermore, a video tape has no absolute address from a viewpoint of the properties of the tape format. Therefore, in order to search and play back a desired musical selection, a search operation by visual confirmation is required, and successive karaoke performances are not easily achieved when viewed from the user side, thus requiring excess time.

Further, when the setting of a reservation for karaoke is made using a conventional program function present in individual categories, a lyrics caption section on the lower portion of the karaoke screen is blocked out due to the relation of the display position of the program setting screen.

Furthermore, in a current VCD program function, since an end event is stored even though additional reservations are possible, the number of reservation events (the total number of reservations) is limited.

As described above, in a conventional compound-playback machine for video tapes and VCDs, there are problems in that such reservation of a karaoke selection as spanning between different sources is impossible, automatic selection of music in a video tape is difficult, and a lyrics caption section is blocked out when a reservation screen is being displayed. In addition, in the VCD program function, there is a problem in that the number of reservation events is limited.

SUMMARY OF THE INVENTION

An object of the present invention is to realize a compound-playback apparatus which solves these problems, which is capable of playing back both video tapes and VCDs, is capable of making playback reservations spanning between both of video tapes and VCDs, is capable of adding the next reservation while reservation playback is being performed so as to add reservations substantially limitlessly, and which is structured in such a way that the lyrics caption section is not blocked out while the reservation screen is being displayed.

To achieve the above-described object, according to the present invention, there is provided a compound-playback apparatus which includes tape-playback control means for controlling the playback of magnetic recording tape and compact-disk playback control means for controlling the playback of a compact disk and which selects and plays back a plurality of recorded contents stored on a magnetic recording tape and a compact disk, wherein there is further provided main control means for controlling the tape-playback control means and the compact-disk playback control means, and the main control means includes playback reservation means for making reservations of the playback sequence of the recorded contents spanning between the magnetic recording tape and the compact disk.

The above and further objects, aspects and novel features of the invention will become more apparent from the following detailed description when read in connection with the accompanying drawings

BRIEF DESCRIPTION OF THE DRAWINGS

FIGS. 5A, 5B1, 5B2, 5B3, 5B4, and 5C are illustrations of a method of setting on the karaoke reservation screen shown in FIG. 4;

FIG. 9 is a table showing the contents of warning messages issued according to a situation;

FIGS. 13A, 13B and 13C are illustrations of the contents of operation keys which can be used during the karaoke reservation mode.

DESCRIPTION OF THE PREFERRED EMBODIMENT

A compound-playback apparatus according to the present invention will be described below in detail with reference to the accompanying drawings.

(1) Construction of the Present Invention

Figure 1:
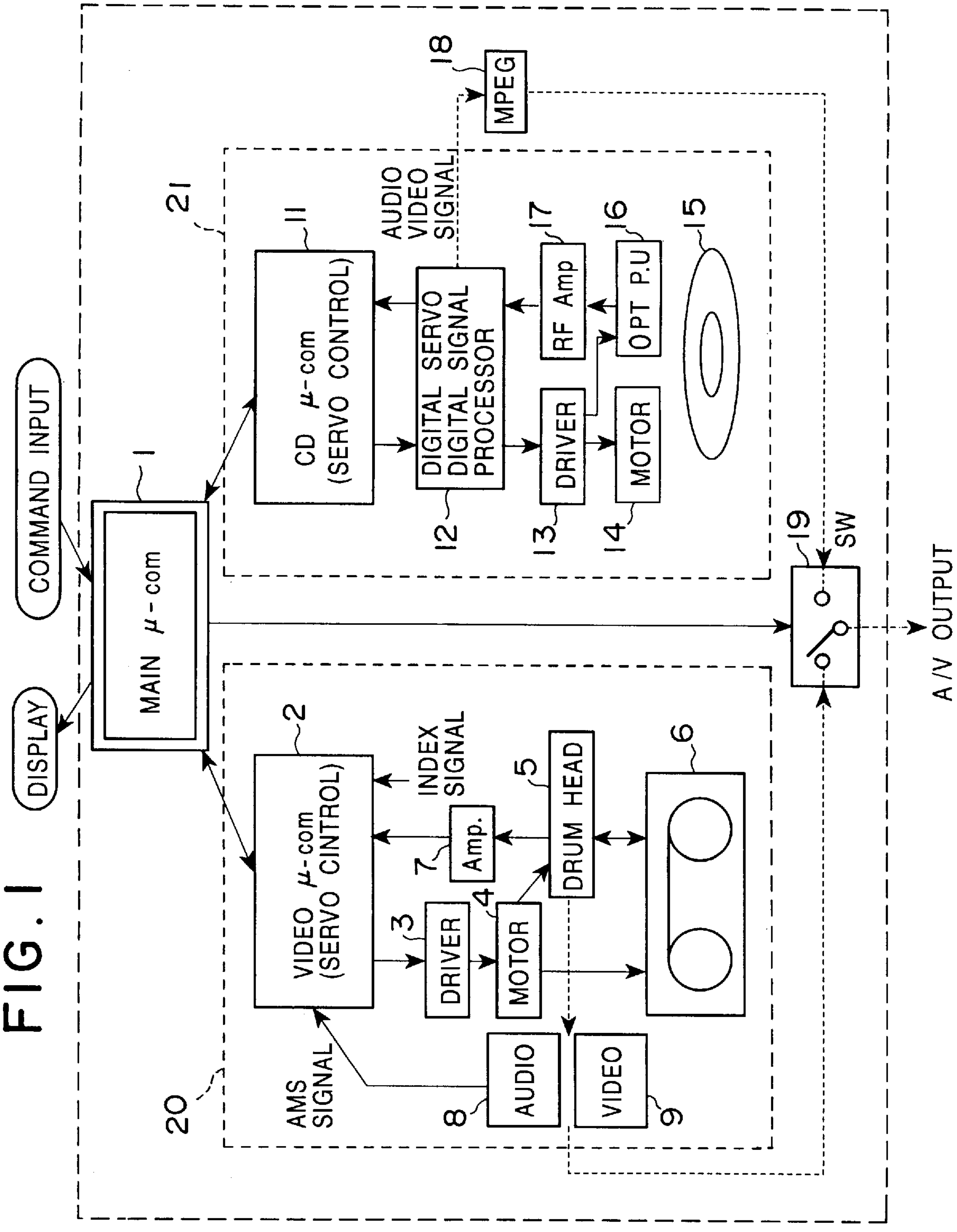
FIG. 1 is a block diagram illustrating the system configuration of a control system of an embodiment of the present invention.

FIG. 1 is a block diagram illustrating the system configuration of a control system of a compound-playback apparatus of the present invention.

In FIG. 1, reference numeral 1 denotes a main microcomputer. Reference numeral 2 denotes a microcomputer on the video tape side. Reference numeral 3 denotes a motor driver on the video tape side. Reference numeral 4 denotes a motor on the video tape side. Reference numeral 5 denotes a head apparatus formed of a drum head and an audio/control head. Reference numeral 6 denotes a video tape cassette. Reference numeral 7 denotes a signal amplifier on the video tape side. Reference numeral 8 denotes an audio amplifier on the video tape side. Reference numeral 9 denotes a video amplifier on the video tape side. Reference numeral 11 denotes a microcomputer on the VCD side. Reference numeral 12 denotes a digital servo/digital signal processor. Reference numeral 13 denotes a motor driver on the VCD side. Reference numeral 14 denotes a motor on the VCD side. Reference numeral 15 denotes a VCD. Reference numeral 16 denotes an optical head. Reference numeral 17 denotes a high-frequency amplifier. Reference numeral 18 denotes an MPEG (Moving Picture Experts Group) interface. Reference numeral 19 denotes a video tape/VCD select switch.

Further, reference numeral 20 denotes a video block portion equivalent to a conventional video-tape apparatus. Reference numeral 21 denotes a VCD block portion equivalent to a conventional VCD apparatus. Further, in addition to these, though not shown, there are included an input apparatus for inputting commands to the periphery of this control system, a display apparatus for displaying an output image and an operation screen, and an acoustic apparatus, such as a microphone, a speaker, a mixer and an amplification apparatus.

This construction will now be described briefly. The main microcomputer 1 has the functions of analyzing an input command and assigning the command to the microcomputer 2 on the video tape side and the microcomputer 11 on the VCD side, and further selecting a control-data output signal from the microcomputer 2 on the video-tape side or the microcomputer 11 on the VCD side and causing a display apparatus (not shown) to display it, and switching the video tape/VCD select switch 19 and outputting an output audio signal and an output video signal from the video tape cassette 6 or the VCD 15 to an output apparatus (not shown).

Further, in the video block 20, the motor 4 on the video tape side is driven in accordance with a driving command from the microcomputer 2 on the video tape side via the motor driver 3 on the video tape side, causing the drum head/video tape cassette 6 to be driven, and a video signal, an audio signal and a control signal are reproduced from the video tape cassette 6 by the head apparatus 5. Of the signals, the control signal is amplified by a signal amplifier and input to the microcomputer 2 on the video tape side where the video signal and the audio signal are reproduced. Thereafter, the signals are amplified by the audio amplifier 8 and the video amplifier 9, respectively, and are selected by the video tape/VCD select switch 19 and output. At this point, an AMS (Automatic Music Sensor) signal, which is a pause signal between pieces of music (events), is sent to the microcomputer 2 so as to be used to select music.

Meanwhile, in the VCD block 21, a driving command from the microcomputer 11 on the VCD side drives a motor driver 13 on the VCD side and a motor 14 on the VCD side via the digital servo/digital signal processor 12, and signals from the VCD 15 are reproduced by the optical head 16. The output of the optical head 16 is amplified by the high-frequency amplifier 17 and input to the digital servo/digital signal processor 12 where audio signals and video signals are reproduced, and after passing through the MPEG interface 18, the signals are selected by the video tape/VCD select switch 19 and output.

At this point, the setting of a karaoke mode, the selection of the video block 20 and the VCD block 21 during the karaoke mode, and the switching of the outputs thereof are performed by the main microcomputer 1. Controlling the karaoke mode by using such main microcomputer 1 makes it possible to realize the functions which are the object of the present invention.

(2) Operation of the Present Invention

The operation of the present invention will be described with reference to the flowchart of FIG. 2.

2-1 How to Enter the Reservation Mode

Figure 3:
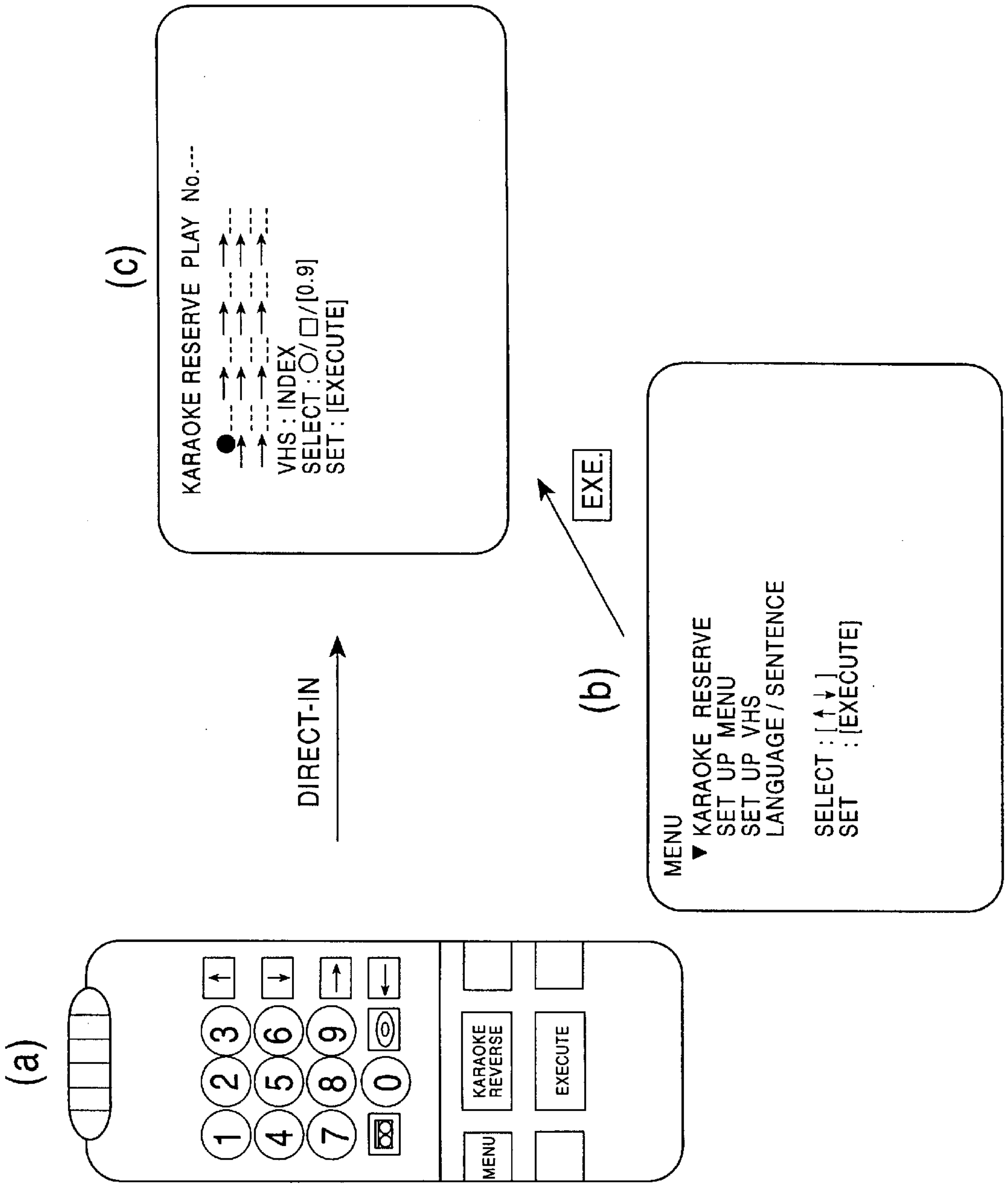
FIG. 3 is an illustration of a remote controller and an operation screen according to the embodiment shown in FIG. 1.

Initially, after starting, a "KARAOKE RESERVE" switch is pressed using a remote controller shown at (a) of FIG. 3 (step 101). Thereupon, the apparatus determines whether or not the conditions for shifting to the reservation mode have been satisfied (step 103). If the shift conditions have been satisfied, this time, a reservation screen such as that at (c) of FIG. 3 is displayed on a display of the display apparatus (step 105). When the conditions for shifting to the reservation mode have not been satisfied, a warning message is set and displayed (step 104).

On the other hand, when entering through a main program, after starting, a "MENU" switch is pressed using the remote controller. Thereupon, a menu screen such as that shown at (b) of FIG. 3 appears on the display of the display apparatus. On this menu screen, "KARAOKE RESERVE" is a karaoke setting screen to be described below. "SET UP MENU" is a condition setting operation screen which is common to this karaoke system. "SET UP VHS" is a condition setting operation screen relating to only the video block 20. "LANGUAGE/sentence" is an operation screen for selecting whether the screen should be displayed in English or Chinese.

At this point, the item "KARAOKE RESERVE" on the menu screen is selected by the remote controller shown at (a) of FIG. 3, and further, "EXECUTE" of the remote controller is pressed. This even makes it possible to enter the reservation screen by inputting a command from the main menu instead of selecting the menu screen by the remote controller in step 101 (step 102).

Here, the following two conditions are the conditions for shifting to the reservation mode in step 103:

Condition A: Should be the karaoke mode.

Condition B: The VCD side is PBC (guide screen for playback process)-OFF. The warning message in step 104 for the above indicates:

when not condition A,

"PLEASE SET TO KARAOKE MODE."

when not condition B,

"PLEASE RELEASE VCD FROM PBC MODE."

when neither condition A nor condition B,

"PLEASE SET TO KARAOKE"

2-2 Reservation Screen

Here, a description will be given of the screen of "KARAOKE RESERVE".

Figure 4:
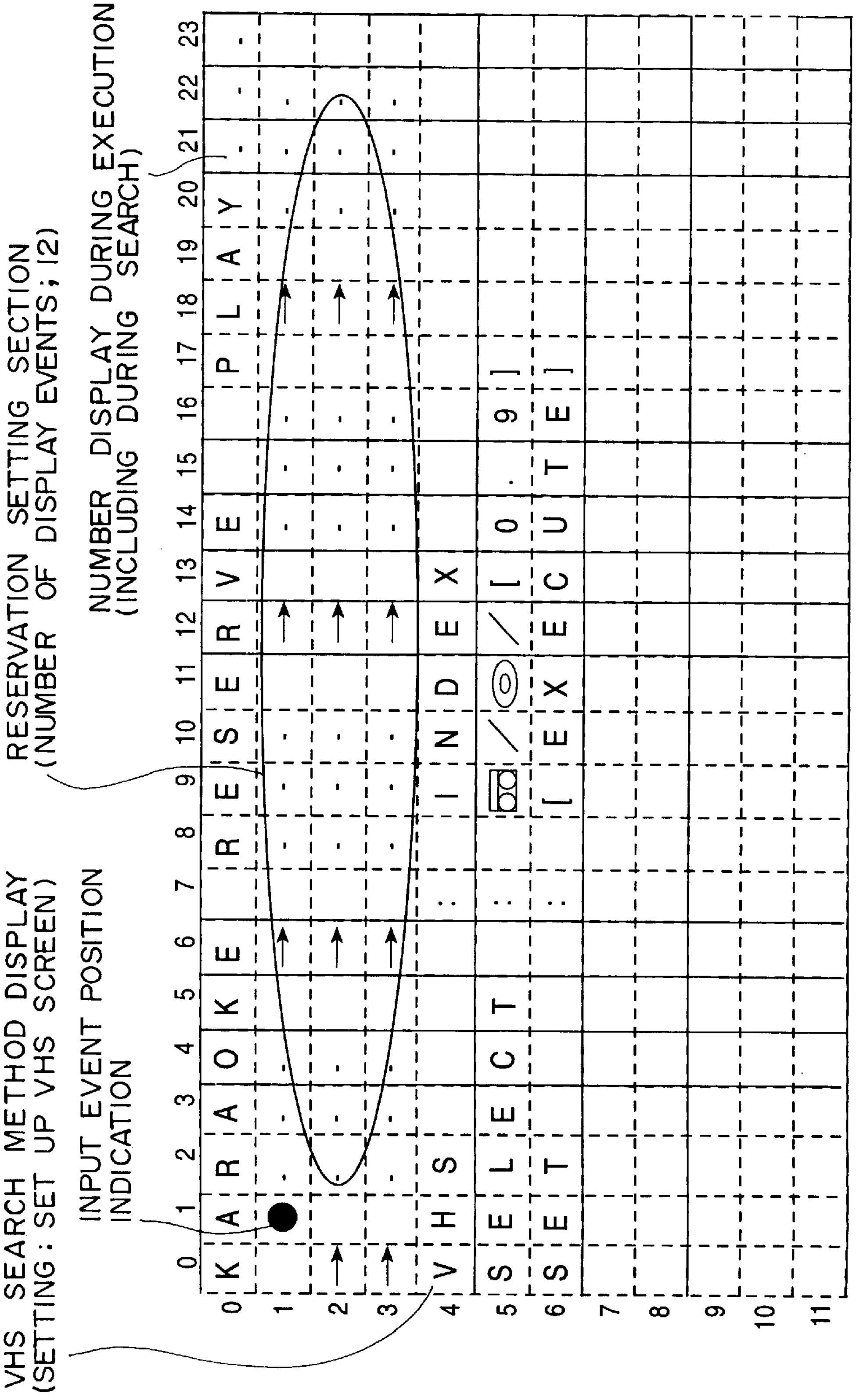
FIG. 4 is a detailed view of a karaoke reservation screen according to the embodiment shown in FIG. 1.

FIG. 4 shows the details of the screen of "KARAOKE RESERVE".

The noteworthy items on this screen display are as follows.

1. When a RESERVE command is input again while the reservation screen is being displayed (before execution), the process exits the reservation mode.

2. When KARAOKE-OFF is set while the reservation screen is being displayed (before execution), the process exits the reservation mode.

3. When the apparatus is PBC-ON while the reservation screen is being displayed (before execution), the process exits the reservation mode.

4. When a MENU command is input while the reservation screen is being displayed (before execution), the process exits the reservation mode.

5. For mode shifts other than the above-described 1 through 4 while the reservation screen is being displayed before execution), it is assumed that the process is able to shift with the reservation screen being opened.

For shift commands requiring screen setting, commands are accepted (operable) with the screen display being kept at the reservation screen.

However, a warning message is displayed on an interrupt base. In this case, after the warning message is displayed a predetermined period of time, the process returns to the reservation screen again.

6. When there is no input for a predetermined time on the reservation screen, a time-out occurs, and the process exits the reservation mode.

7. When this reservation screen is opened while the reservation is in execution, the process enters a confirmation mode. At this time, resetting and correction become possible as will be described later.

8. The reservation screen is set to a superimposition when there is a picture (in the VHS-EE mode in which a video signal has been input from an external source, in the confirmation mode during the playback of an event, etc.) in the background, and is set to a blueback when there is not a picture in the background.

2-3 Music Sequence-number Reservation Setting in Reservation Mode

When the reservation screen is displayed as described above, a reservation is made by setting the source and the music sequence number (step 106).

On the reservation screen, the number of events such that playback reservation can be set at a time is a maximum of 12 musical selections. However, since the set musical selection sequence numbers are shifted with the progress of execution during execution, additional setting becomes limitlessly possible in sequence.

The setting of music is performed by setting a playback reservation source and setting a musical selection sequence number. All of the reservation settings for music are performed by a screen display input method and operated by a remote controller.

Figure 5A:
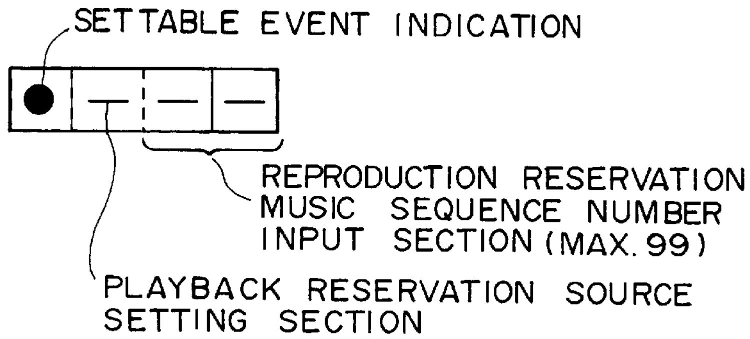

That is, as in FIG. 5A, ● is displayed as a cursor in a settable event display column which is one column in the reservation setting section of the reservation screen, and a succession of three digits of "-" are in a blinking state in the playback reservation source setting section and the playback reservation music sequence-number setting input section which follow the foregoing column.

To input a music sequence number, two digits are input using [0] to [9] keys.

Referring to FIGS. 5B1, 5B2, 5B3 and 5B4, a method of setting a musical selection will be described step-by-step using a case in which a third musical selection in a video disk is selected as an example.

Figure 5B:
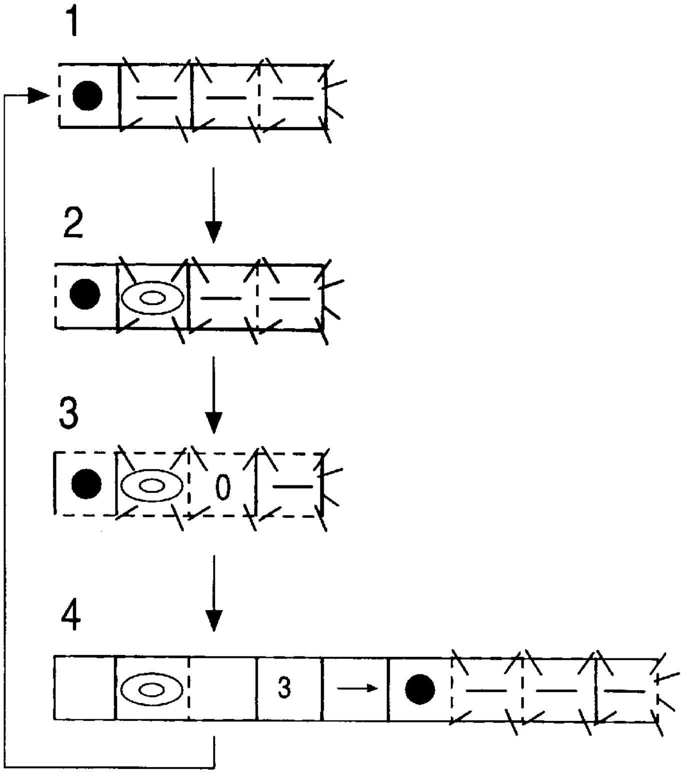

Initially, as shown in FIG. 5B1, a ● mark is displayed in the set table event display column, and "- - - " is displayed to blink in a linked manner in the three columns which follow the set table event display column as a setting input standby event. Thereafter, even if information is input, this blinking continues until it is fixed.

Figure 2:
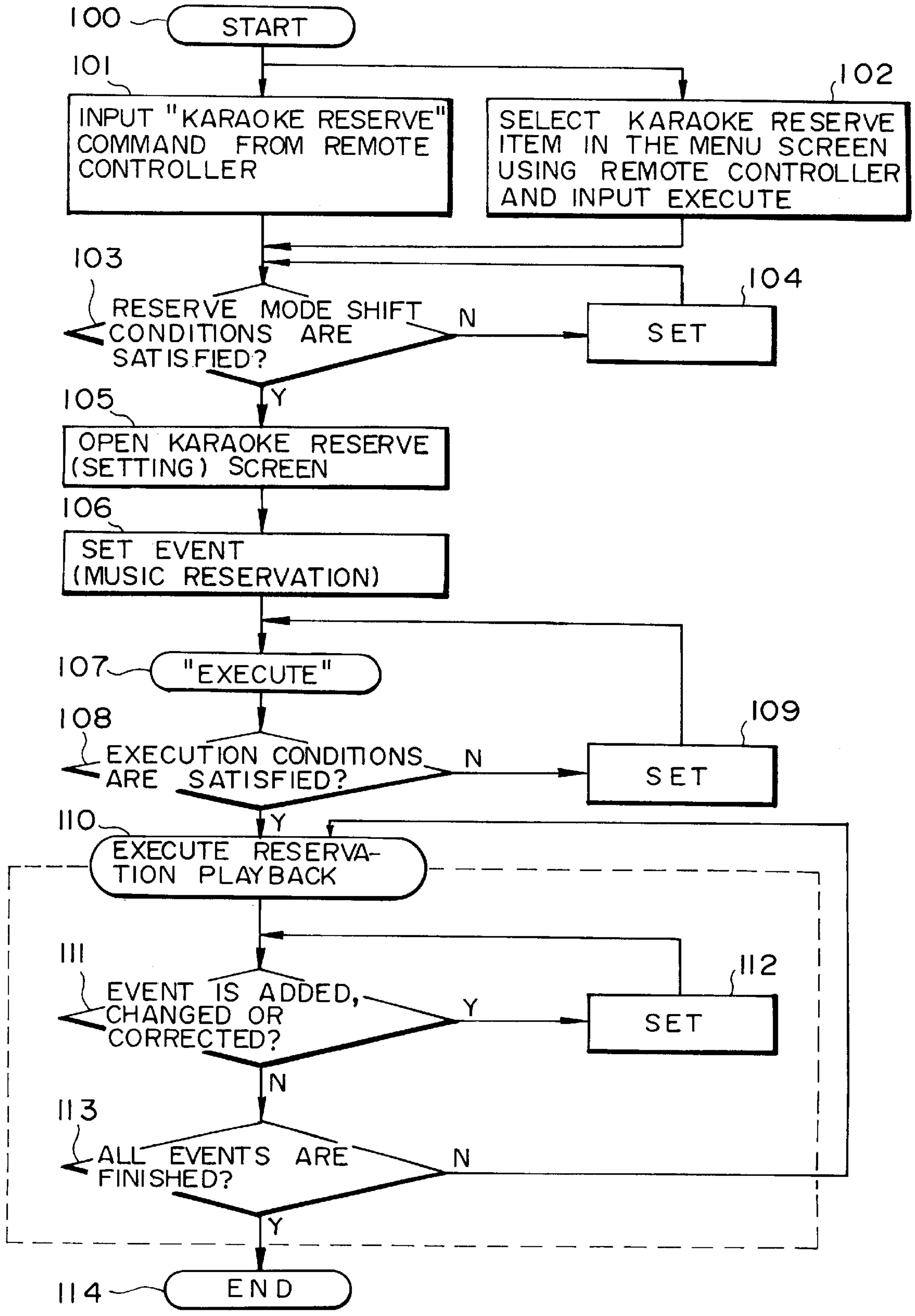
FIG. 2 is a flowchart illustrating the operation of the embodiment shown in FIG. 1.

As shown in FIG. 5B2, the user selects and inputs the source of the musical selection desired to be reserved by using either a "Video-CD" or "VHS" key of the remote controller. During the reservation mode, shifting of the mode set by the "Video-CD" and "VHS" command is not performed.

Next, as shown in FIG. 5B3, when the musical selection desired to be reserved is a third musical selection, "0" in the 10's unit place is input first. To input a reservation musical selection sequence number, a ten-key is used, and a two-digit input method is used.

Next, as shown in FIG. 5B4, "3" in the 1's unit place is input. This input fixes the music reservation setting, the ● mark moves to the next set table event display column, and the process proceeds to the next event input. When the music reservation setting is fixed, on the display, "0" in the 10's unit place is deleted and not displayed.

Figure 5C:
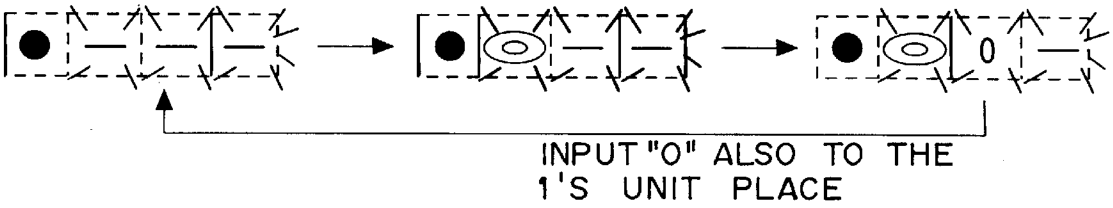

As shown in FIG. 5C, when sequence number 00 is input in the reservation music sequence-number setting section of the event display column which is not set before being input and is displayed as "- - - " the input contents are cancelled and the process returns to the initial "- - - " display.

Figure 6A:
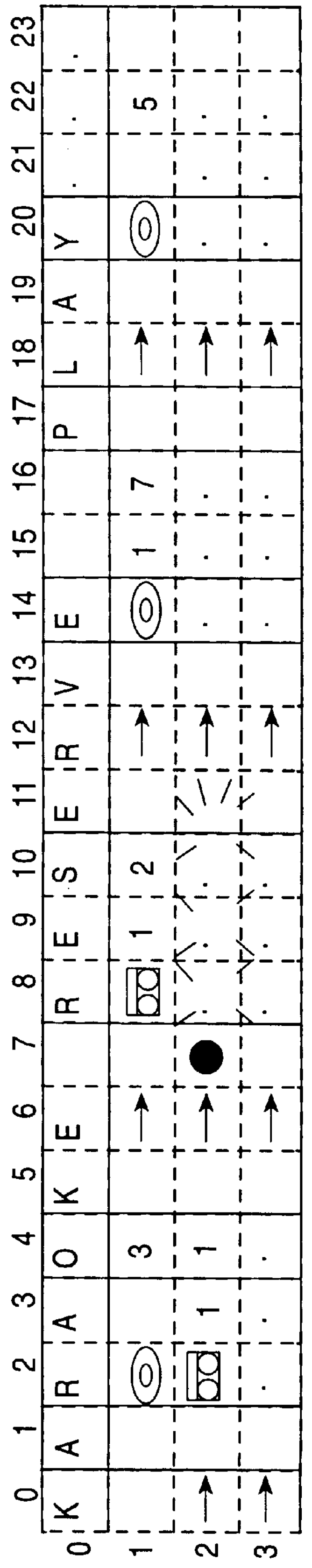
FIGS. 6A and 6B are illustrations of the setting state and the cursor position on the karaoke reservation screen shown in FIG. 4.

FIG. 6A shows an example of a display while a plurality of reservations are set. While reservations are set, the reservation setting standby event column is always the next event column of the final fixed event column.

Figure 6B:
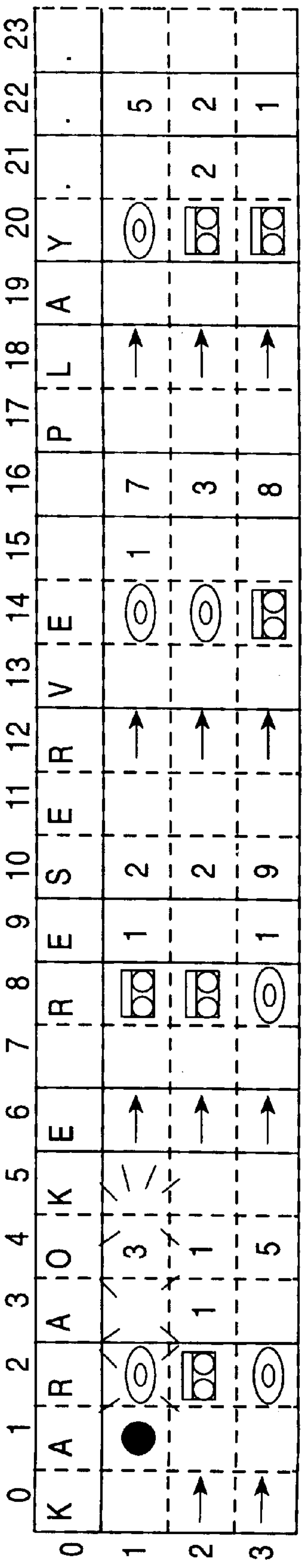

FIG. 6B shows an example of a display after reservations are set up to the final event column (a twelfth music). When the final event column is fixed, the ● mark of the cursor returns to the first event column in the same manner as when the reservation screen is opened at first.

That is, the ● mark of the cursor when the reservation screen is opened is always at the position of "- - - " for a reservation input standby, and when all of the event columns are filled in, the process returns to the beginning position.

2-4 Correction of Fixed Event

Figure 7:
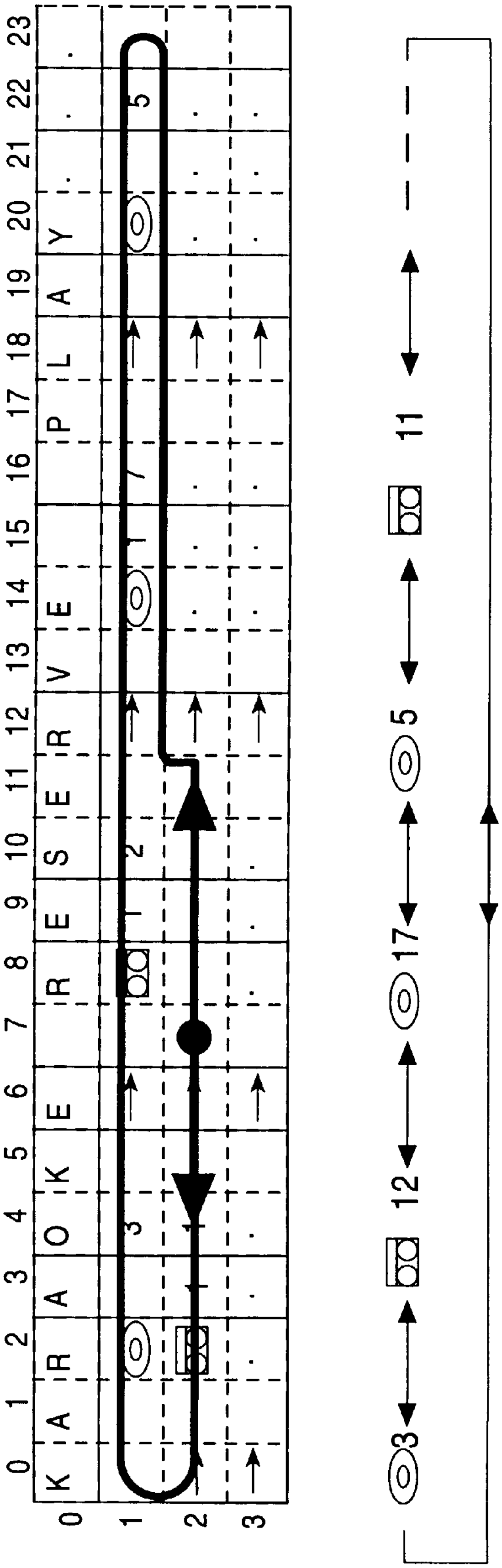
FIG. 7 is an illustration of the movement of the cursor on the karaoke reservation screen shown in FIG. 4.

As shown in FIG. 7, it is possible to move the cursor using cursor right and left movement keys of the remote controller within the reservation fixation event column and the reservation standby event column. In FIG. 6A, it is possible to move the cursor and correct the fixed contents by overwriting on the fixed event column. As the cursor moves, the ● mark of the cursor moves in the event indication column.

When correcting the fixed event, the cursor is moved to the fixed event column desired to be corrected, and a reentry is performed by the same procedure as input setting. At the same time as the fixation of the new input, the reservation event shifts.

Figure 8:
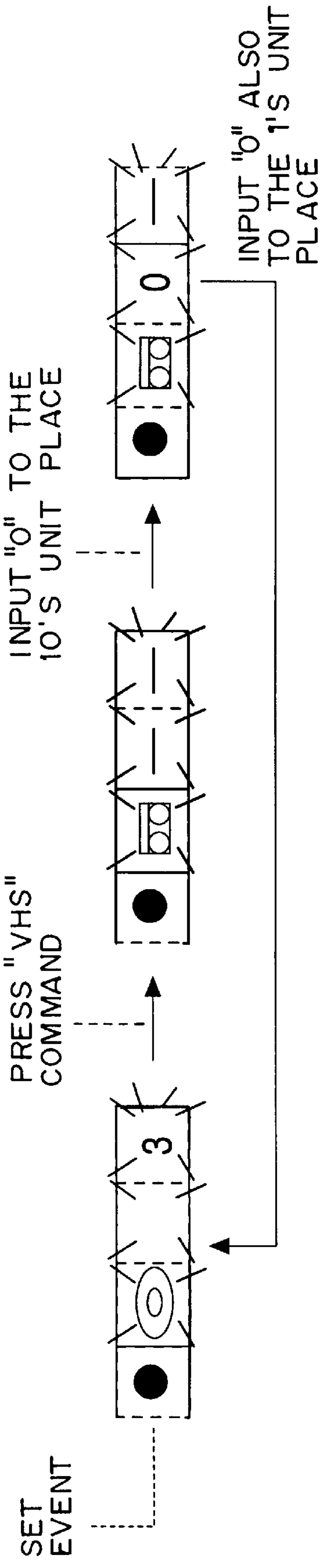
FIG. 8 is an illustration of the case where number "00" is input on the karaoke reservation screen shown in FIG. 4.

As shown in FIG. 8, when the cursor is moved to the set event column and sequence number 00 is input, the shifting of the reservation event is not performed, and the set value of the same event as before input is displayed again and the apparatus waits for a reentry.

2-5 Execution of the Reserved Contents

The conditions for performing the reserved contents are the following two conditions.

Condition C: the final mode on the video tape side is tape in stop.

Condition D: the final mode on the VCD side is disk in stop.

Upon pressing of the "EXECUTE" command of the remote controller (step 107), when these two conditions are satisfied (step 108), the playback of the reserved contents is performed (step 110). When the conditions are not satisfied, a warning message is displayed in accordance with the conditions in FIG. 9 (step 109).

The warning messages are the following:

Warning message A: "PLEASE SET DISC & TAPE."

Warning message B: "PLEASE STOP DISC & TAPE."

When no reservation event has been input and set (fixed), pressing the "EXECUTE" command of the remote controller causes the apparatus to exit the reservation mode.

2-6 Playback Execution Operation of Reserved Contents

In step 110, playback is performed in accordance with the preset musical selection sequence number.

First, a conventional operation in the reservation mode in a single unit is as described below.

Execution Operation on the VCD Side

The VCD is played back by searching the music of the reserved sequence number by TIME SEARCH. This is the same as the conventional method for a single unit.

Execution Operation on the Video Tape Side

A video tape has no absolute address. For this reason, the video tape is rewound up to the beginning of the tape once at the time the reservation is executed.

Figure 10:
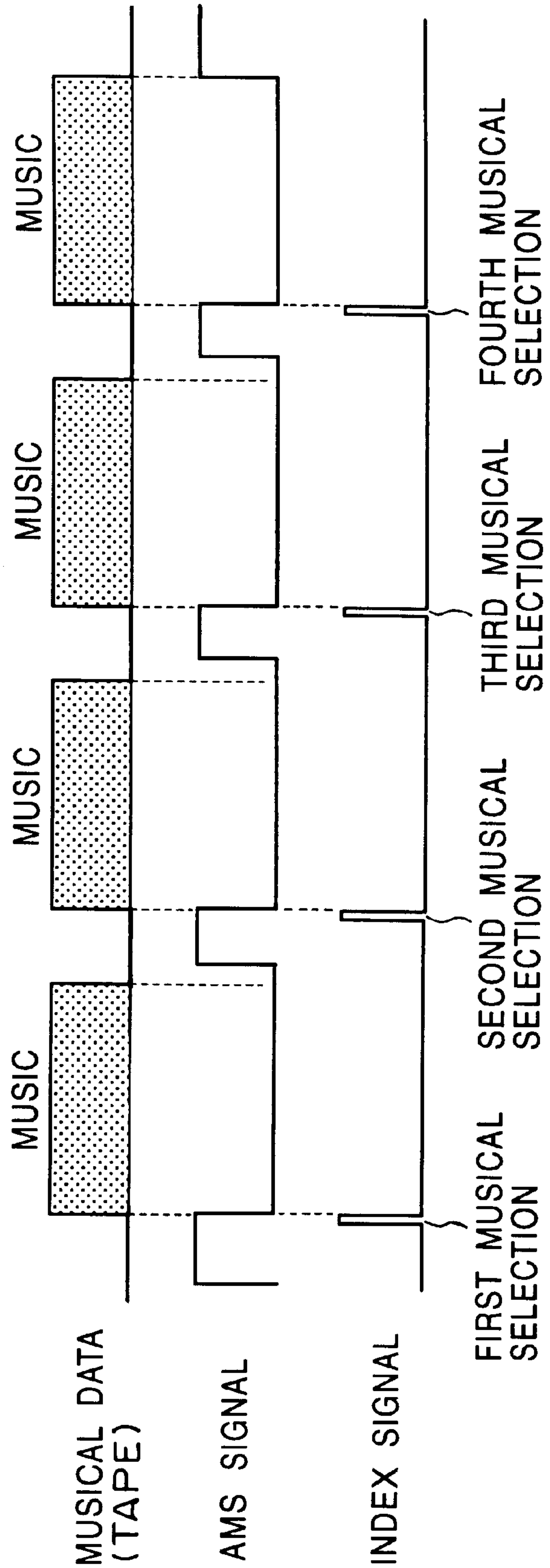
FIG. 10 shows timing charts illustrating the time relationship among musical data, an AMS signal and an INDEX signal in the embodiment shown in FIG. 1.

Next, the number of musical selections is counted from the beginning of the tape in accordance with a search method (AMS or INDEX) set in the "SET UP VHS" menu in order to perform searching. (The conceptual view of musical data, an AMS signal and an INDEX signal at this time is such as that shown in FIG. 10.)

When counting up to the target musical selection sequence number is performed, playback is started at that point in time. The termination of playback of one musical selection is determined by watching the AMS signal regardless of whether the search method is an AMS method or an INDEX method.

The reserved sequence number of the next event in the video tape method is counted successively from the count value of the musical selection sequence number of the previous event in order to perform searching. Rewinding to the beginning of the tape is performed only at the first time of execution.

If the tape end is reached beyond the normal beginning of the tape or the end of the tape during search or playback or if the apparatus is stopped because of that, the apparatus exits the reservation mode, and a warning message to that effect is displayed.

Compound Execution Operation Spanning Between VCDs and Video Tapes

The search operation during playback execution is performed as described above independently for each of a VCD and a video tape.

At the execution start time, even when there is no reservation setting on the video tape side, when the final mode on the video tape side is not the beginning of tape, the tape is rewound to the beginning of the tape at the same time as the execution, causing the process to be placed in a reservation standby state so as to prepare for additional settings.

When the source changes at the next event, the change will take place (output switch) at the start of playback.

In the next-event playback standby state, when there is the next event, the video tape side waits for the playback of the next event in a stopped state after searching has terminated. The VCD side waits and stops at the position of the termination of the previous event, and searching and playback are performed at the same time as the starting of the execution of the event. When there is no next event, the video tape side also stops at the termination position of the previous event. However, the stopped position is stored and held. The VCD side stops and waits at the termination position of the previous event.

When the playback of all of the reserved events is terminated, the reservation mode terminates. The termination mode at this time is in a stopped state for both the VCD and the video tape.

This compound operation will be described below with reference to FIGS. 11A to 11D.

Figure 11A:
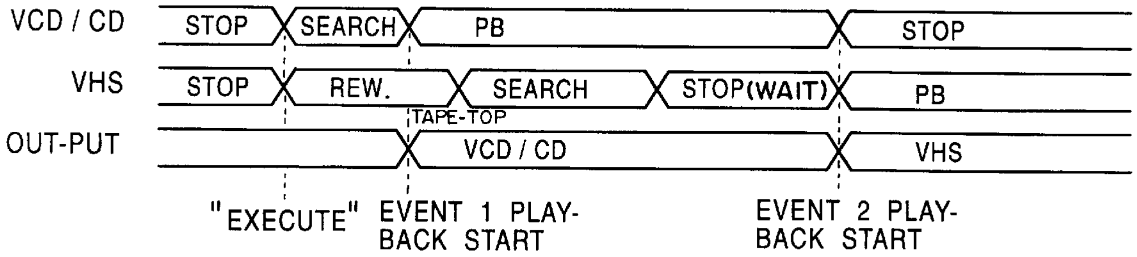
FIGS. 11A to 11D show timing charts illustrating the time relationship between the compound operations of a video tape apparatus and a VCD apparatus.

FIG. 11A is a timing chart of the outputs of a VCD and a video tape when a first event is on the VCD side and a second event is on the video tape side. In this example, when the "EXECUTE" command of the remote controller is pressed, the VCD side enters a search state, and enters playback as soon as the search is terminated. Meanwhile, the video tape side performs tape rewinding during this time to return to the beginning of tape once, then searches a second event scheduled next and stops and waits at that state. Upon termination of the first event on the VCD side, the video tape side enters the playback of the second event.

Figure 11B:
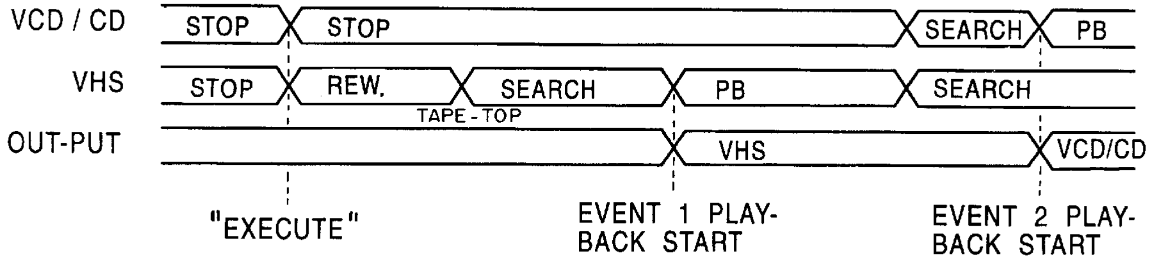

FIG. 11B is a timing chart of the outputs of a VCD and a video tape when a first event is on the video tape side and a second event is on the VCD side. In this example, when the "EXECUTE" command of the remote controller is pressed, the video tape side performs tape rewinding in order to return to the beginning of tape once, searches a first event scheduled next and enters playback as soon as the search is terminated. Meanwhile, the VCD side performs searching upon the termination of the first event on the video tape side and enters playback as soon as the search is terminated.

Figure 11C:
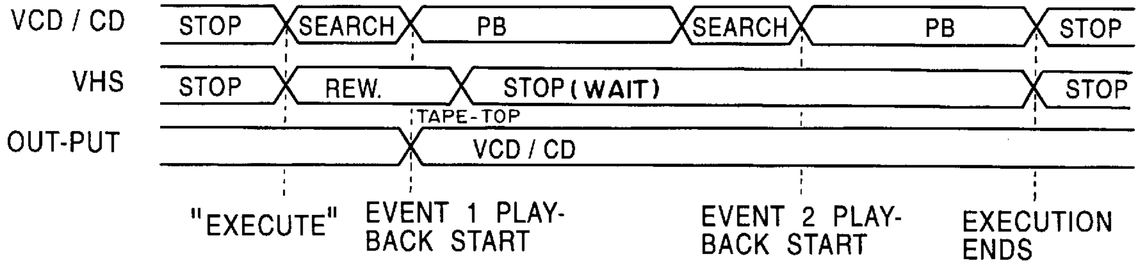

FIG. 11C is a timing chart of the outputs of a VCD and a video tape when both a first event and a second event are on the VCD side. In this example, when the "EXECUTE" command of the remote controller is pressed, the VCD side performs searching immediately, enters playback of the first event as soon as the search is terminated, performs searching immediately as soon as the first event is terminated, and enters playback of the second event as soon as the search is terminated. The video tape side performs tape rewinding in order to return to the beginning of the tape once, and waits at that state when there is no reserved event on the video tape side.

Figure 11D:
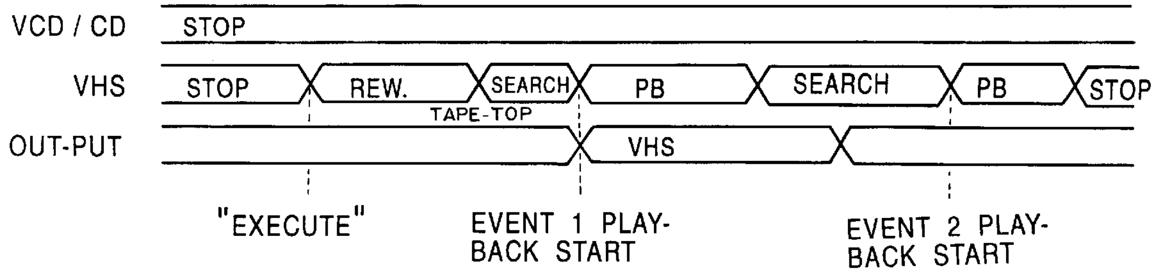

FIG. 11D is a timing chart of the outputs of a VCD and a video tape when both a first event and a second event are on the video tape side. In this example, when the "EXECUTE" command of the remote controller is pressed, the video tape side performs tape rewinding in order to return to the beginning of tape once, then searches the first event scheduled next, and enters a playback as soon as the search is terminated. When the first event is terminated, the second event is searched and played back as soon as the search is terminated.

Figure 12:
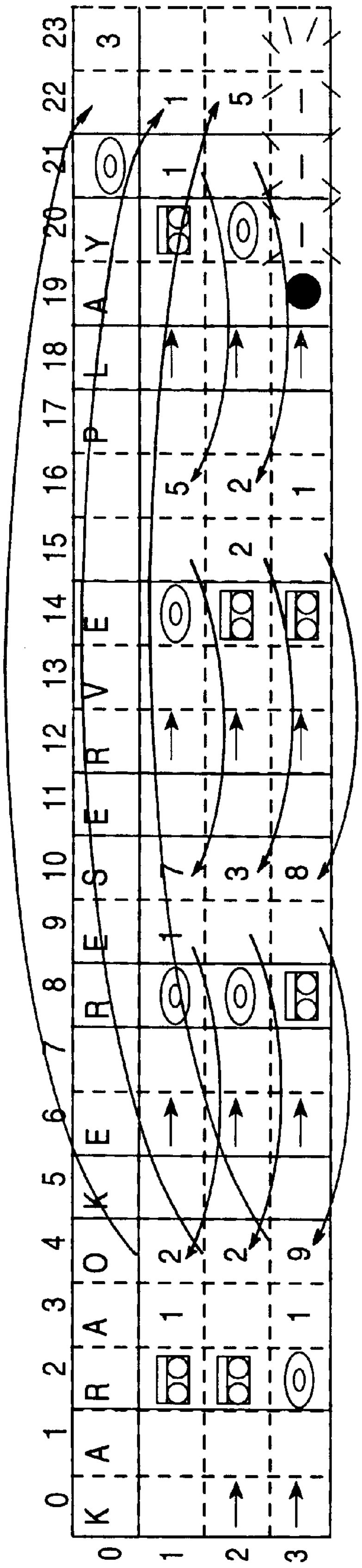
FIG. 12 is an illustration of the movement of the reservation content display on the karaoke reservation screen during the execution operation.

The state of the reservation screen when such reservations are executed is shown in FIG. 12. With the start of the execution, the beginning reservation event display moves to the PLAY position display on the upper right of the display. When the display is moved to the PLAY position once, the execution standby is fixed and the changing of the contents is not possible. Even the ● mark of the cursor cannot move to this position.

Along with this, the event display is shifted to the front one by one. If all the event display is filled in, the final position becomes where waiting for an input is performed, and the ● mark of the cursor moves here.

When the execution-reserved event shown on the PLAY position display is executed and the playback is terminated, the reserved contents are replaced with the next reserved event, and the reserved events are shifted one by one.

2-7 Usable Keys During Execution Operation

Next, a description will be given of operation keys of a single unit on the video block (video tape) side, which can be used during execution operation. (There are no usable keys during execution operation on the VCD block (VCD apparatus) side).

Of the keys (MECHA shift commands) for operating the mechanical system, the commands which can be used during the execution of the reservation mode are such as those shown in FIGS. 13A, 13B and 13C. Here, the functions of some keys differ from those in the normal mode.

Here, when the command of a VHS/INDEX SEARCH KEY (FIG. 13A) in the right (Forward) direction is received during the playback of an event, the process moves to the next event. This key is used when it is desired to skip an unknown music and move to the next.

Further, when the command of a VHS/INDEX SEARCH KEY (FIG. 13B) in the left (Rewind) direction is received during the playback of an event, the video tape returns to the beginning of the music of the event being currently played back. This key is used when it is desired to sing the song again from the beginning after playback.

Further, when the command of a CHOI (FIG. 13C) (a CHOI (meaning in Japanese: short)—return key attached to the mike) is received during the playback of the event, the tape is rewound only while the key is being pressed.

In the case of tape, since there is no absolute address, if rewinding which by-passes the music is performed by this command, the music setting may deviate.

Further, when an operation key (MECHA shift command) other than these is pressed, it is assumed that the key command is executed, and the process exits the reservation mode as it is. At this time, a warning message to that effect is displayed.

Figure 14A:
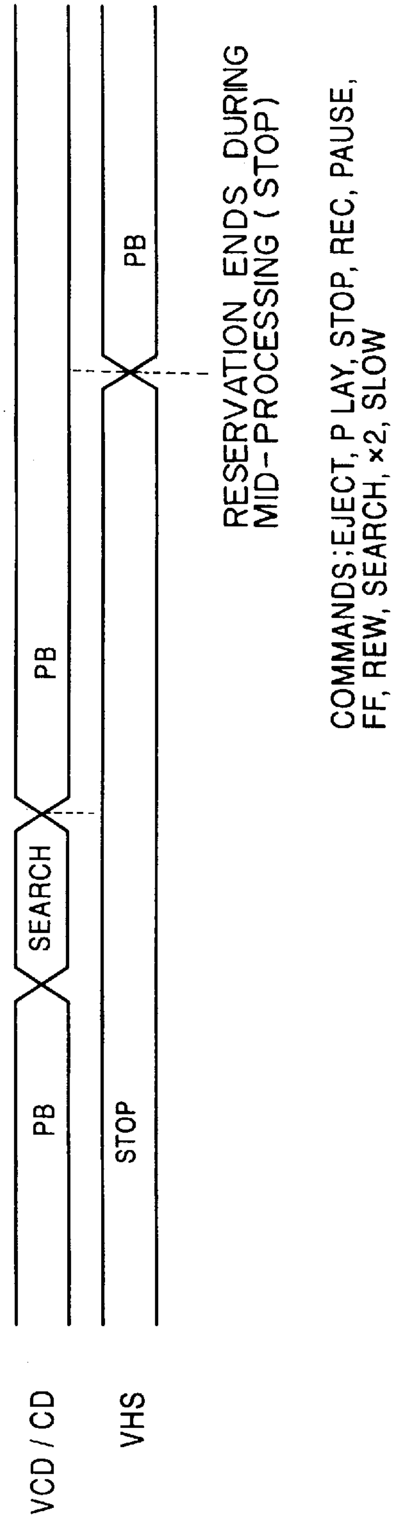
FIGS. 14A and 14B are illustrations of the mode conversion when operation keys which cannot be used during the karaoke reservation mode are used.

FIG. 14A is a timing chart of the outputs of a VCD and a video tape when the PLAY key for a video tape is pressed during the execution of the reservation mode. As a result of the pressing of the PLAY key on the video tape side, the reservation is terminated during the mid-processing; if the VCD side is being played, it is stopped, and the video tape is played back successively from the event whose start is located currently in the video tape.

Such operation keys on the video tape side are EJECT (tape eject), PLAY (playback), STOP (stop), REC (record), PAUSE (pause), FF (fast forward), REW (rewind), SEARCH (search), ×2 (2-times speed), SLOW (low-speed supply), etc.

Figure 14B:
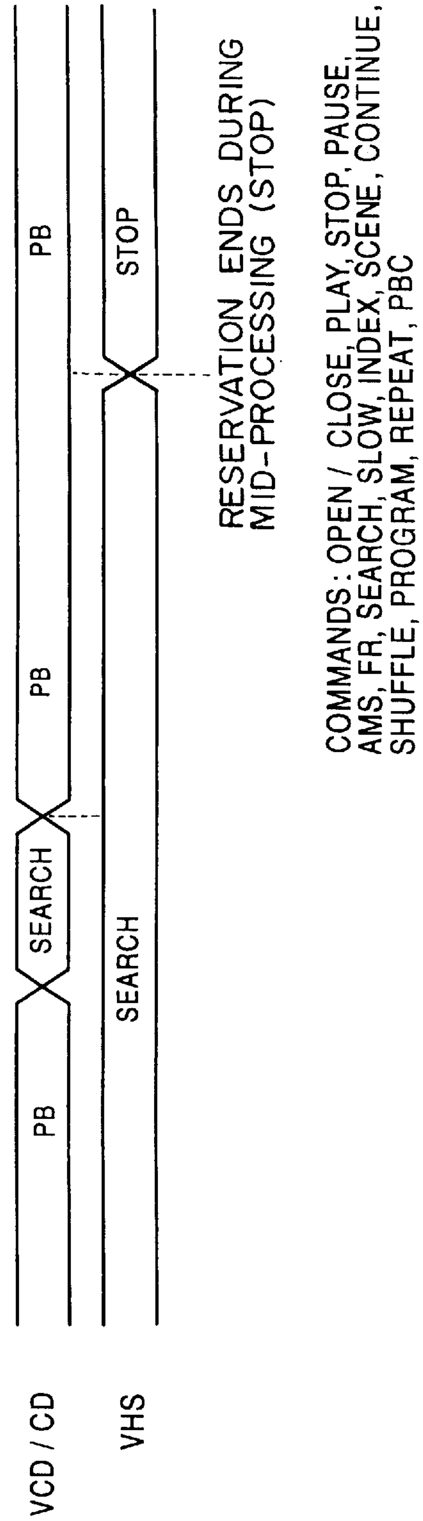

FIG. 14B is a timing chart of the outputs of a VCD and a video tape when the PLAY key for the VCD is pressed during the execution of the reservation mode. As a result of the pressing of the PLAY key on the VCD side, the reservation mode is terminated during the mid-processing, and if the VCD side is being played back, the VCD is successively played back continuously as it is.

Such operation keys on the VCD side are OPEN/CLOSE (for taking a CD in and out), PLAY (playback), STOP (stop), PAUSE (pause), AMS (one-music direct search), FR SEARCH (forward/reverse search), SLOW (low-speed supply), INDEX (one-music index search), SCENE (still-image screen display), CONTINUE (continuous playback), SHUFFLE (playback from the beginning again after termination), PROGRAM (playback method designation), REPEAT (repetition of event being currently played back), PBC (guide screen for playback process), etc.

In addition to these, when a "POWER" command is received, the process exits the reservation mode and powers off without providing a warning display. Further, when a "VCD" or "VHS" command is received, the process exits the reservation mode and makes a warning display.

Further, operation keys accompanying the MECHA shift command are accepted according to the normal specifications. Further, of the MENU setting items, as a single setting which undergoes a limitation, there is a selection item (INDEX/AMS) of the VHS SEARCH method. A selection operation for this is accepted, but its operation is assumed to be performed at the reservation-mode re-execution time.

2-8 Addition, Change and Correction of Event

During the karaoke reservation execution, when an addition, change and/or correction of an event occurs during the execution of the reservation playback (step 111), the KARAOKE RESERVE MENU is opened, and overwriting and/or addition are performed onto the reservation fixation event column and the reservation wait event column by the same method as the correction of the fixed event in 2-4, making the addition, change and/or correction of an event possible (step 112). The fixation of the addition, change and correction is at the time when the input of an event is completed. When all of the reserved events have terminated, the process is terminated, and if there are remaining reservations, the playback of the remaining reserved events is executed (step 113).

2-9 Warning Message During Execution Operation

A warning message which displays when the process stops during the mid-processing and exits the reservation mode:

"KARAOKE RESERVE IS STOPPED."

A warning message which displays when the playback of the reserved events up to the end has been completed:

"KARAOKE RESERVE IS FINISHED."

A warning message which displays when the VHS is rewound up to the beginning of tape after the execution and is in an event playback standby state:

"REWIND TO BEGINNING OF TAPE NOW."

A warning message which displays during searching:

"NEXT PROGRAM IS No. ???."etc.

With the present invention being constructed as described above, even though a basically conventional-type apparatus is used, it becomes possible to play back both video tapes and VCDs, and possible to make playback reservations extending over both video tapes and VCDs. Further, addition of the next reservation is possible during the execution of reservation playback, reservations can be added substantially limitlessly, the lyrics caption section is not blocked out while this reservation screen is being displayed, and further, the karaoke operation including a karaoke reservation can be easily performed from a remote controller. Thus, the present invention has high ease of use.

As has been described up to this point, the present invention of claim 1 provides a compound-playback apparatus which has tape-playback control means for controlling the playback of magnetic recording tape and compact-disk playback control means for controlling the playback of a compact disk and which selects and plays back a plurality of recorded contents stored on a magnetic recording tape and a compact disk, wherein there is further provided main control means for controlling the tape-playback control means and the compact-disk playback control means, and the main control means has a playback function for making reservations of the playback sequence of the recorded contents extending over the magnetic recording tape and the compact disk. As a result, even though a basically conventional-type apparatus with a relatively simple construction is used, it becomes possible to play back both video tapes and VCDs and to make playback reservations extending over both video tapes and VCDs.

In the present invention of claim 2, the magnetic recording tape is a video tape, the compact disk is a video compact disk, and there is provided playback video display means for displaying playback video of the video tape and the video compact disk.

As a result, it is possible to easily achieve what is commonly called a karaoke function.

In the present invention of claim 3, the playback video display means includes superimposition means for displaying by superimposition a control screen for playback reservations on a part of the screen.

As a result, it is easy to set playback reservations and becomes possible to observe a lyrics section during the playback reservations.

In the present invention of claim 4, there is provided remote control means for inputting control signals, including a playback reservation signal for controlling the playback reservation means, to the main control means. As a result, it is possible to easily make playback reservations, and the ease of use of the user is improved.

In the present invention of claim 5, the tape-playback control means locates the beginning of the next playback contents of the magnetic recording tape while the compact disk is being played back by the compact-disk playback control means.

As a result, it is possible to find the beginning of a tape while a compact disk is being played back and to shorten the waiting time until playback.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A compound-playback apparatus, comprising:

tape-playback control means for controlling the playback of a magnetic recording tape and which selects and plays back a first plurality of recorded contents stored on at least one magnetic recording tape;

compact-disk-playback control means for controlling the playback of a compact disk and which selects and plays back a second plurality of recorded contents stored on at least one compact disk; and main control means for controlling said tape-playback control means and said compact-disk-playback control means, wherein said main control means includes playback reservation means for making reservations of a playback sequence of said first and second pluralities of recorded contents spanning between said at least one magnetic recording tape and said at least one compact disk.

2. A compound-playback apparatus according to claim 1, wherein said at least one magnetic recording tape is at least one video tape, said at least one compact disk is at least one video compact disk, and the compound-playback apparatus further includes playback-video display means for displaying playback video of said at least one video tape and said at least one video compact disk.

3. A compound-playback apparatus according to claim 2, wherein said playback-video display means includes superimposition means for displaying by superimposition on a part of the playback-video display means a control screen for playback reservation.

4. A compound-playback apparatus according to one of claims 1 to 3, wherein the compound-playback apparatus includes remote control means for inputting control signals, including a playback-reservation signal, for controlling said playback-reservation means.

5. A compound-playback apparatus according to one of claims 1 to 3, wherein said tape-playback control means locates the beginning of the next playback contents of said at least one magnetic recording tape while said at least one compact disk is being played back by said compact-disk-playback control means.

6. A compound-playback apparatus according to one of claims 1 to 3, wherein said tape-playback control means locates the beginning of the next playback contents of said at least one magnetic recording tape while said at least one compact disk is being played back by said compact-disk-playback control means, and wherein the compound-playback apparatus includes remote control means for inputting control signals, including a playback-reservation signal, for controlling said playback-reservation means.

7. An apparatus for playing karaoke, comprising:

a tape-playback control circuit configured to control the playback of a magnetic recording tape and to select and play back a first plurality of recorded contents stored on at least one magnetic recording tape;

a compact-disk-playback control circuit configured to control the playback of a compact disk and which selects and plays back a second plurality of recorded contents stored on at least one compact disk; and a main control circuit configured to control said tape-playback control circuit and said compact-disk-playback control means, wherein said main control circuit includes a playback reservation circuit configured to make reservations of a playback sequence of said first and second pluralities of recorded contents spanning between said at least one magnetic recording tape and said at least one compact disk, wherein said playback reservation circuit is further configured to make reservations during a playback operation.

8. The apparatus of claim 7, wherein said at least one magnetic recording tape is at least one video tape, said at least one compact disk is at least one video compact disk, and the apparatus further includes a playback-video display screen configured to display playback video of said at least one video tape and said at least one video compact disk, and wherein said main control circuit is further configured to display by superimposition on a part of said playback-video display screen a control screen for playback reservation.

9. A method of controlling a combination tape player and compact disk player to play back karaoke, comprising the steps of:

playing back one of (1) a first plurality of recorded contents stored on at least one magnetic recording tape, and (2) a second plurality of recorded contents stored on at least one compact disk; and reserving a third plurality of recorded contents for subsequent playback, wherein said step of reserving is performed during said step of playing back.

10. The method of claim 9, further comprising the step of:

displaying by superimposition, with the recorded contents played back in said step of playing back, a control screen for playback reservation.

* * * * *

UNITED STATES PATENT AND TRADEMARK OFFICE

CERTIFICATE OF CORRECTION

PATENT NO.: 5,999,497
DATED: 12/07/99
INVENTOR(S): YOSHIO OCHIAI ET AL.

It is certified that an error appears in the above-identified patent and that said Letters Patent is hereby corrected as shown below:

Title page of [75] Inventors: -- Yoshio Ochiai, Saitama; Koji Saito, Tokyo, both of Japan --.

Signed and Sealed this

Fifteenth Day of August, 2000

*Attest:*

Q. TODD DICKINSON

*Attesting Officer* *Director of Patents and Trademarks*